US008618788B2

(12) United States Patent
Trivedi et al.

(10) Patent No.: US 8,618,788 B2
(45) Date of Patent: Dec. 31, 2013

(54) DYNAMICALLY ADJUSTED MULTI-PHASE REGULATOR

(76) Inventors: Malay Trivedi, Chandler, AZ (US); Erik A. McShane, Phoenix, AZ (US); James T. Doyle, Prescott, AZ (US)

( * ) Notice: Subject to any disclaimer, the term of this patent is extended or adjusted under 35 U.S.C. 154(b) by 0 days.

(21) Appl. No.: 11/731,161

(22) Filed: Mar. 30, 2007

(65) Prior Publication Data
US 2008/0238390 A1 Oct. 2, 2008

(51) Int. Cl.
*G05F 1/00* (2006.01)

(52) U.S. Cl.
USPC .................. 323/327; 323/241; 323/283

(58) Field of Classification Search
USPC ......... 323/283, 271–275, 282, 284, 285, 241, 323/242, 300, 320, 910, 237; 363/36, 65, 363/69–71, 87
See application file for complete search history.

(56) References Cited

U.S. PATENT DOCUMENTS

| | | | | |
|---|---|---|---|---|
| 6,031,886 A * | 2/2000 | Nah et al. | ........................ | 375/375 |
| 6,278,263 B1 * | 8/2001 | Walters et al. | ................. | 323/272 |
| 6,366,069 B1 * | 4/2002 | Nguyen et al. | ................. | 323/282 |
| 6,433,527 B1 * | 8/2002 | Izadinia et al. | ................ | 323/300 |
| 6,495,995 B2 * | 12/2002 | Groom et al. | .................. | 323/283 |
| 6,600,296 B2 * | 7/2003 | Hazucha | ........................ | 323/237 |
| 6,670,794 B1 * | 12/2003 | Wang et al. | .................... | 323/213 |
| 6,803,752 B1 * | 10/2004 | Chen | ............................... | 323/282 |
| 6,826,028 B2 * | 11/2004 | Schuellein | .................... | 361/93.1 |
| 6,879,138 B2 * | 4/2005 | Dinh et al. | ..................... | 323/284 |
| 6,947,273 B2 * | 9/2005 | Bassett et al. | .................. | 361/111 |
| 7,005,835 B2 * | 2/2006 | Brooks et al. | .................. | 323/282 |
| 7,019,502 B2 * | 3/2006 | Walters et al. | ................. | 323/282 |
| 7,030,596 B1 * | 4/2006 | Salerno et al. | ................. | 323/282 |
| 7,061,215 B2 * | 6/2006 | Harris | ........................... | 323/268 |
| 7,071,660 B2 * | 7/2006 | Xu et al. | ........................ | 323/266 |
| 7,202,643 B2 * | 4/2007 | Miftakhutdinov | ............ | 323/224 |
| 7,262,628 B2 | 8/2007 | Southwell et al. | | |
| 7,492,134 B2 | 2/2009 | Tang et al. | | |
| 2005/0265269 A1 * | 12/2005 | Saito et al. | ..................... | 370/310 |
| 2006/0001408 A1 | 1/2006 | Southwell et al. | | |
| 2006/0280019 A1 * | 12/2006 | Burton et al. | .................. | 365/226 |
| 2007/0013350 A1 * | 1/2007 | Tang et al. | ..................... | 323/237 |
| 2007/0096955 A1 * | 5/2007 | New | ................................ | 341/50 |

FOREIGN PATENT DOCUMENTS

| | | |
|---|---|---|
| EP | 1513247 | 3/2005 |
| EP | 1513247 A1 | 9/2005 |
| JP | 11-127573 A | 5/1999 |
| JP | 2003-527062 A | 9/2003 |
| JP | 2005-86998 A | 3/2005 |
| JP | 2005-110498 A | 4/2005 |
| JP | 2006-180689 A | 7/2006 |
| WO | 2005/076433 A1 | 8/2005 |
| WO | WO-200576433 | 8/2005 |

OTHER PUBLICATIONS

"High-Frequency, Multiphase Controller", Texas Instruments, SLUS578B—Oct. 2003—Revised May 2006; 30 pgs.

(Continued)

*Primary Examiner* — Adolf Berhane
*Assistant Examiner* — Emily P Pham
(74) *Attorney, Agent, or Firm* — Erik R. Nordstrom

(57) ABSTRACT

In some embodiments, a multi-phase converter with dynamic phase adjustment is provided. In some embodiments, a controller may include circuitry to control how many phase legs are active based on output current and also which phase legs are to be enabled.

23 Claims, 3 Drawing Sheets

(56) References Cited

OTHER PUBLICATIONS

"UCD9240 Digital Point of Load System Controller", Texas Instruments, UCD9240 SLUS766—Apr. 2007; 21 pgs.
Office Action Received for Japanese Patent Application No. 2008-087188, delivered on Aug. 3, 2010, 3 Pages of English Translation.
Office Action Received for Japanese Patent Application No. 2008-087188, delivered on Aug. 16, 2011, 6 pages of Japanese office action including 3 pages of English Translation.
Office Action Received for Chinese Patent Application No. 200810100384.9, issued on on Jan. 29, 2010, 9 Pages of Chinese office action including 3 pages of English Translation.
Office Action Received for Germany Patent Application No. 10 2008 016 532.8 , mailed on on Mar. 24, 2009, 6 Pages of Germany office action including 3 pages of English Translation.
Office Action Received for Japanese Patent Application No. 2008-087188, delivered on Feb. 8, 2011, 4 Pages of Japanese office action including 2 pages of English Translation.
Third Office Action mailed May 16, 2012 for Chinese Patent Application No. 2008 10100384.9.
Final Office Action mailed Feb. 8, 2011 for Japanese Patent Application No. 2008-087188, 4 Pages.
Non-Final Office Action mailed Aug. 3, 2010 for Japanese Patent Application No. 2008-087188, 5 Pages.
Non-Final Office Action mailed Mar. 24, 2009 for German Patent Application No. 10 2008 016 532.8-32, 6 Pages.
Non-Final Office Action mailed Nov. 23, 2011 for Chinese Patent Application No. 2008 10100384.9, 17 Pages.
Non-Final Office Action mailed Jan. 29, 2010 for Chinese Patent Application No. 2008 10100384.9, 17 Pages.
Fourth Office Action mailed Dec. 10, 2012 for Chinese Patent Application No. 2008 10100384.9.
Office Action received for Japanese Divisional Patent Application No. 2011-275607, mailed on Jul. 9, 2013, 2 pages of English Translation and 2 pages of Office Action.

* cited by examiner

US 8,618,788 B2

DYNAMICALLY ADJUSTED MULTI-PHASE REGULATOR

BACKGROUND

The present invention relates generally to voltage regulators and in particular, to switching-type regulators including but not limited to multi-phase switching type buck, boost, buck-boost regulators and synchronous versions of the same.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Various embodiments disclosed herein describe dynamically adjustable, multi-phase voltage regulators (VRs), which can provide for enhanced efficiency response characteristics.

Multiphase switching regulators such as so-called buck converters are commonly used to deliver a regulated DC voltage to components including, but not limited to, microprocessors, chipsets, memory cards and graphics accelerators. Switching type regulators generally use at least one or more switch and/or rectifier elements and an inductor to implement a "phase leg" to deliver switchably controlled current from an applied voltage source to a load through a regulated voltage node. When the load requires more current, the one or more switches are controlled to supply the load with current from the applied voltage for longer durations within a switching period. Conversely, the current is applied for smaller durations in the period when less current is required by the load.

Switching losses in the switch elements tend to dominate the overall power losses at light loads, while conduction losses tend to dominate power losses for larger loads. As a result, power conversion efficiency is typically at its highest for relatively intermediate load conditions, and tends to roll off at both light and higher load conditions under conventional operation.

With multi-phase regulators, several phase legs are commonly coupled to the regulated voltage node to deliver to it their current. The conduction time of the individual phase legs are staggered, typically uniformly, over a switching interval to minimize output voltage/current ripple, and to reduce the size of output capacitance needed to filter switching noise. This technique is commonly referred to as multi-phase power conversion. It is common for multiphase converters to be optimized for relatively high-load current conditions in order to reduce conduction type power losses. Unfortunately, electronic components, e.g., on computing platforms, can spend much time in a low-current "idle" mode, which can result in inefficient regulator operation and undesired loss of power. Such losses are magnified, for example, with battery operated platforms. Accordingly, new approaches may be desired.

Figure 1:
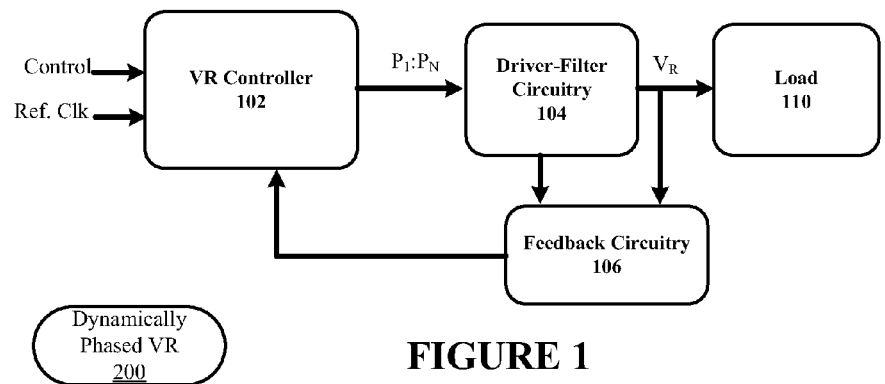
FIG. 1 is a block diagram of a of a voltage regulator in accordance with some embodiments of the invention.

FIG. 1 generally shows a multi-phase VR in accordance with some embodiments. It comprises a VR controller 102 (sometimes referred to as a pulse width modulator, PWM), driver-filter circuitry 104, and feedback circuitry 106, all coupled together as shown to provide a regulated voltage supply $V_R$ to a load 110. The VR controller comprises logic and circuits to provide pulse-width-modulated drive signals ($P_1:P_N$) to phase legs within the driver filter circuitry 104. The feedback circuitry is coupled to the $V_R$ node, as well as to/within the driver filter circuitry 104, to provide to the controller 102 voltage and current feedback signals to regulate the output voltage VR, as well as to dynamically control the differently phased phase legs to maintain desired operating efficiency. The voltage feedback corresponds to $V_R$, while the current feedback (which may actually be conveyed using voltage signals) indicates current in the phase legs provided to the load 110.

The controller controls the phase legs so that the load current is distributed substantially evenly amongst all active phase legs (or phases). Depending on load current demand, a number of the phases are enabled so that each phase operates at a suitably efficient level over a given load current range. In some embodiments, the controller monitors the overall average load current and enables a selected number of the phases so that the average current per phase is maintained within a suitable window for desired efficiency. As the overall load current demand goes up, phases may be activated and conversely, as load current goes down, they may be dropped out. In some embodiments, the phases may be dropped, one at a time, as the load becomes lighter with the lightest load operation being supported by a single phase.

Figure 2:
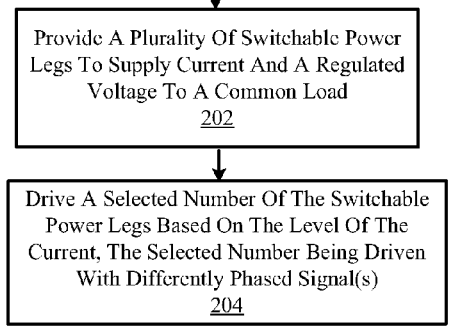
FIG. 2 is a routine for implementing a dynamically phased voltage regulator in accordance with some embodiments.

FIG. 2 shows a routine for dynamically controlling a multi-phase VR in accordance with some embodiments. At 202, a plurality of phase legs are provided to supply current and a regulated voltage to a common load. At 204, a selected number of the phase legs are driven with differently phased drive signals. The selected number is dynamically based on the amount of current required by the load.

Figure 3:
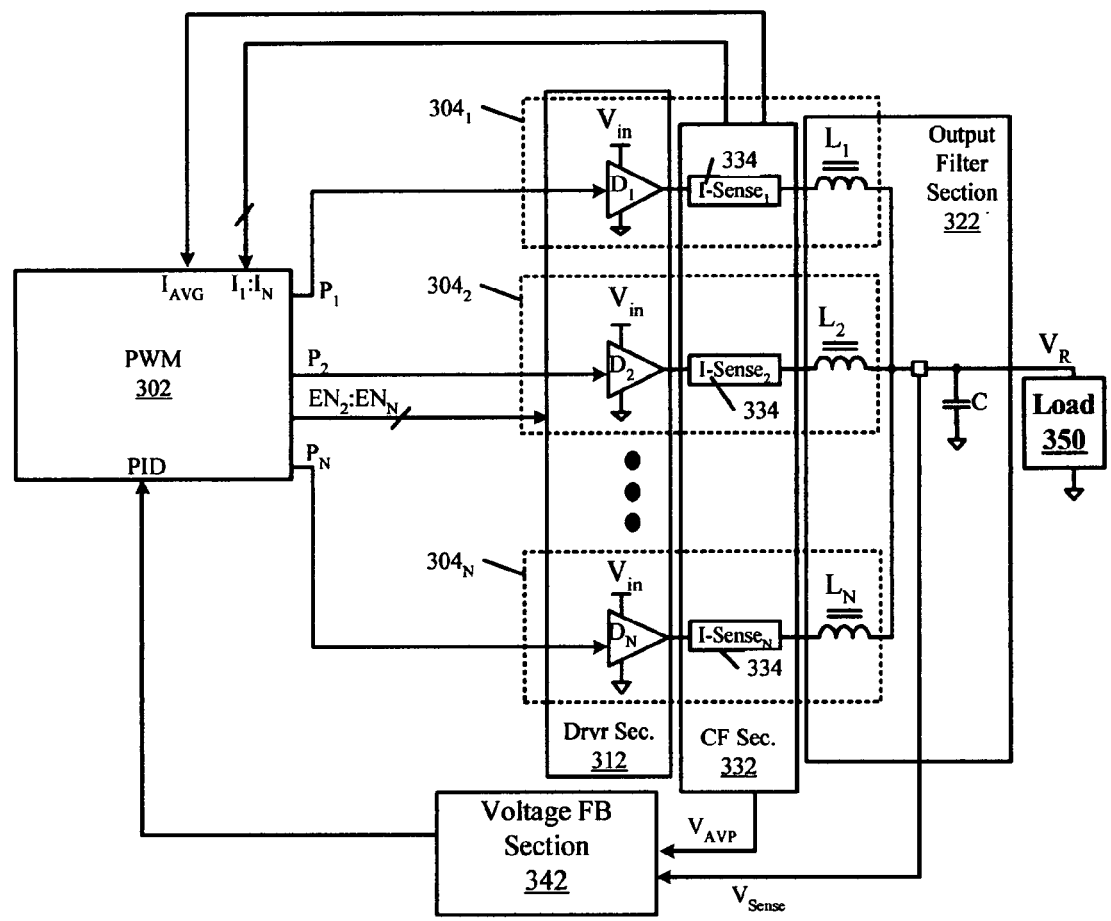
FIG. 3 is a diagram of a dynamically phased, multi-phase voltage regulator in accordance with some embodiments.

FIG. 3 shows a multi-phase switching DC-to-DC converter (voltage regulator) 300 with dynamic phase control, in accordance with some embodiments of the converter of FIG. 1. Converter 300 generally comprises a pulse width modulator (PWM) (or controller) 302, driver section 312, output filter section 322, current feedback section 332, and voltage feedback section 342, all coupled as shown, to provide a regulated voltage (VR) to a load 350. (The current and voltage feedback sections may correspond to the feedback circuitry 106 from FIG. 1.)

In the depicted embodiment, the driver section 312 comprises N drivers ($D_i$); the current feedback section 332 comprises N current sensors (I-Sense$_i$), and the output filter section 322 comprises N inductors ($L_i$) and a capacitor C. The drivers ($D_i$) are coupled to the inductors ($L_i$) through the current sensors (I-Sense$_i$), forming N phase legs $304_i$. The phase legs $304_i$ are coupled, as shown, to a common output voltage node ($V_R$) to feed current into regulated load 350.

As used herein, the term "phase leg" refers to a driver (i.e., one or more switching and/'or rectifier elements) coupled to one or more inductors and/or capacitors and to a regulated voltage node to controllably couple an applied supply (e.g., $V_{in}$) to a regulated load via the one or more inductors and/or capacitors. The phase leg may implement a phase of a multiphase converter for any desired converter scheme including but not limited to a buck, synchronous buck, boost, buck-boost, or fly back converter. For example, in a synchronous buck type converter, a driver ($D_i$) in a phase leg may comprise complementary PMOS and NMOS transistors coupled with their drains commonly connected to an inductor to switchably couple it to an applied high-side supply, couple it to a low-side supply, or tri-state it. On the other hand, the phase legs could be configured to implement a standard buck type driver, for example, with a switch such as a transistor coupled to an inductor having a diode coupled from the low supply referenced to the switch-inductor node to provide the inductor with current when the switch is open. Countless other driver and inductor/capacitor implementations will be appreciated by one of ordinary skill and are within the scope of the present invention.

Along the same lines, it should be appreciated that the inductors could be implemented with any type of inductor (or transformer technique for that matter) to provide a desired amount of inductance, which might vary depending on design concerns and operating environment. For example, they could be made with magnetic cores or implemented with so-called "air-cores". They could be arranged to be magnetically coupled to one another, or alternatively, some or all could be in a destructive coupling arrangement. In some cases, they might even be implemented with simple traces or the like depending on such factors as switching frequencies and design concerns.

(The term "PMOS transistor" refers to a P-type metal oxide semiconductor field effect transistor. Likewise, "NMOS transistor" refers to an N-type metal oxide semiconductor field effect transistor. It should be appreciated that whenever the terms: "transistor", "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs and oxide thicknesses to mention just a few. Moreover, unless specifically referred to as MOS or the like, the term transistor can include other suitable transistor types, e.g., junction-field-effect transistors, bipolar-junction transistors, and various types of three dimensional transistors, known today or not yet developed.)

In the depicted embodiment, the current feedback section 332 comprises current sensors 334 (I-Sense$_i$) coupled in series between associated drivers ($D_i$) and inductors ($L_i$) to provide a signal ($I$)$_{indicative\ of\ current\ in\ a\ phase\ leg}$. They may be implemented with any suitable device or combination of devices to monitor current in a leg without substantially impeding its current. In the depicted embodiment, each sensor is disposed between a driver and an inductor, but this is not required. For example, they could be inserted anywhere within a phase leg to indicate its current. In fact, a separate sensor element may not even have to be inserted in the phase leg current path. For example, in some embodiments, a transistor may be coupled across a transistor in a phase leg's driver (e.g., P-type transistor coupled to the applied supply) in a current mirror configuration, to indicate the current in the phase leg. The additional transistor forming the mirror may be coupled in series, e.g., with a resistor, to provide a voltage signal that is indicative of the current in the leg. In the depicted embodiment, the phase leg current signals ($I_i$) are voltage signals indicative of the current in their respective phase legs.

The current feedback section 332 also comprises circuitry (not shown) to sum the power leg currents and provide an overall average load current signal ($I_{AVG}$) for the load 340. (For example, a capacitor could be used to integrate the sense current signals from active (enabled) phase legs 304$_i$.) The average load current ($I_{AVG}$), as well as the individual sense current signals ($I_1$:$I_N$) are provided back to the PWM 302.

With the depicted embodiment, the current feedback section 312 also has circuitry to generate an active voltage positioning signal ($V_{AVP}$) to be provided to the voltage feedback section 342 for offset adjustment of the regulated output ($V_R$) to account for load-line impedance.

The voltage feedback section 342 receives a sensed voltage ($V_{Sense}$) from the regulated output ($V_R$), as well as the $V_{AVP}$ signal, to generate a proportional-integral-derivative (PID) signal to be used by the PWM 302 to track the regulated output voltage ($V_R$) against a desired reference voltage (not shown). Additionally, in some embodiments, the voltage feedback section 342 may provide suitable feedback compensation (e.g., with a broadband feedback compensator circuit) to provide for stable system response for phase additions and removals (discussed more below).

PWM 302 generates control (e.g., drive) signals ($P_1$ to $P_N$) to be applied to the phase legs to controllably couple them to or decouple them from the associated applied voltage ($V_{in}$). The PWM 302 also generates phase enable ($EN_2$ to $EN_N$) signals to selectably enable or disable phase legs 304$_2$ to 304$_N$, respectively, depending on how much load current (as indicated by $I_{AVG}$) is being drawn.

In operation, the PWM generates drive signals ($P_1$ to $P_N$) to controllably couple associated inductors to the applied voltage ($V_{in}$). Based on its applied drive signal ($P_i$), a driver ($D_i$), in proportion to the duty cycle of its applied drive signal, controls the average amount of current provided to the load through its inductor ($L_i$) and thus can be used to regulate the load voltage ($V_R$). The drive signals ($P_i$) are thus said to be "pulse width modulated" for regulating the output load voltage ($V_R$).

The drive signals ($P_1$ to $P_N$) are skewed in time (phase shifted) so that switching noise, from each inductor is distributed in time. This reduces ripple and allows for a greater overall amount of current to be provided to the load than could otherwise be provided by a single phase leg. The PWM 302 monitors the average load current ($I_{AVG}$) and compares it with one or more thresholds to cause an appropriate number of phases (phase legs) to be enabled for desired efficiency for the range of operational load currents. As the load current increases to a next higher "window", the PWM engages an additional phase (phase leg). Conversely, if the load current goes down to a next lower window, it drops out (disengages) a phase. In this way, for the most part, it maintains the average current-per-phase within a desired efficiency range.

When a phase is added or dropped, the PWM 302 redistributes the remaining phases over the switching cycle. The feedback loop and the output capacitance should be selected so that the noise in the regulated voltage at the time of phase realignment remain within stable operation limits.

Rapid changes in load conditions may cause a spike or droop in the output regulated voltage. Accordingly, a voltage sense element (shown in the figure) to detect load transients may be employed to monitor such transients. The PWM 302 may be configured so that when such load transients are detected, the PWM reacts quickly to activate all phases to allow for rapid charging or discharging of the output capacitor in response to the transient event. For stable handling of load transient and corresponding phase adjustment events, it may be desirable (if not necessary) to have relatively low-bandwidth current sensing such as the averaging scheme discussed above with the generation of $I_{AVG}$.

Figure 4:
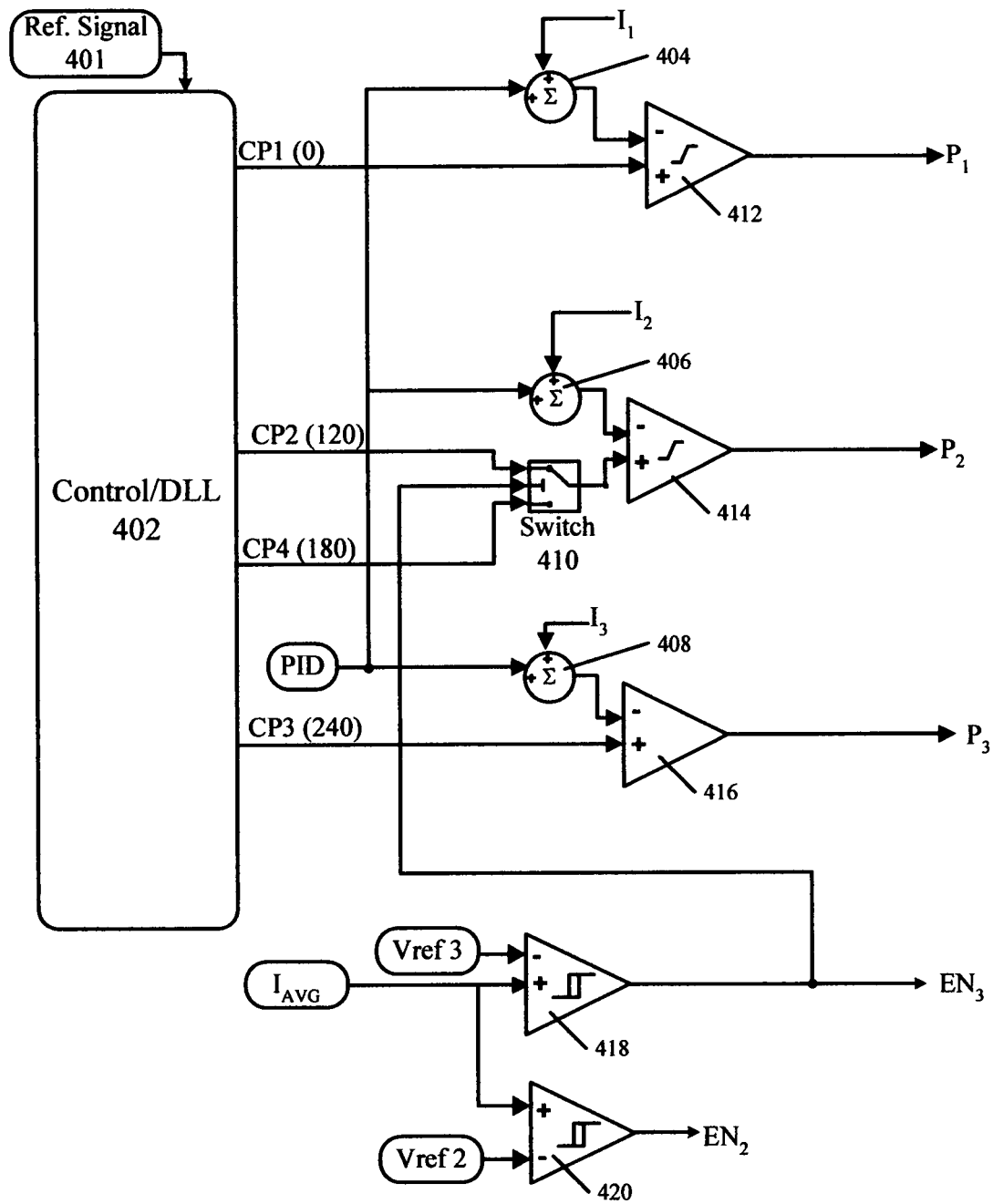
FIG. 4 is a diagram of a portion of a pulse width modulator suitable for the voltage regulator of FIG. 3 in accordance with some embodiments.

FIG. 4 shows a portion of a PWM 302 in accordance with some embodiments for a 3-phase multi-phase converter example. It generally comprises control/DLL (delay locked loop) circuitry 402, summing circuits 404-408, 2:1 switch 410, comparators 412-416, and hysteretic comparators 418, 420, coupled together as shown.

The control/DLL circuit 402 receives a reference signal 401 and generates from it four reference phase signals: CP1 to CP4. CP1 has a phase angle of 0°; CP2 has a phase angle of 120°; CP3 has a phase angle of 240°; and CP4 has a phase angle of 180°. In the depicted embodiment, the reference signal is a clock (e.g., pulse-train) signal used as a reference phase for the DLL circuitry to generate clocks with the desired phase angles. The differently-phased pulse clocks are then converted to triangular signals with corresponding phase angles to provide the $CP_i$ signals. However, other approaches could be used. For example, with other PWM approaches, pulse clocks could be used for the CP signals, or alternatively, if triangular CP signals are desired, a triangular reference wave could be used as the input reference and appropriate delay circuitry could be used to generate from it the differently-phased triangular signals. In some embodiments, reference phases and the differently phased signals with frequencies in excess of 10 MHz., e.g., 50 MHz., may be employed.

In the depicted embodiment, the DLL has delay stages with at least four tap points to provide the four control phase signals (CP1 to CP4) with their indicated phase relationships. these signals are then converted to triangular signals, with corresponding phase angles, and provided for the $CP_i$ signals. The control/DLL may also include circuitry (e.g., level shifting circuitry) to adjust an offset in each of the control phase signals in order to implement the pulse width modulation for control of the regulated voltage ($V_R$).

Summing circuit 404 receives the PID signal and the sense current signal $I_1$ from phase 1 and adds them together to generate a sum that is coupled to the negative input of comparator 412. The other input receives the CP1 control phase signal. The comparator output generates phase signal P1, which is a pulse train with a duty cycle that is controlled by the comparison between PID+$I_1$ and CP1. The PID+$I_1$ sum essentially serves as a moving comparator threshold against the CP1 triangular wave. When CP1 is below PID+$I_1$, then P1 is Low. Conversely, when CP1 rises above PID+$I_1$, then P1 goes High. Accordingly, the PID and $I_1$ signals provide negative feedback because when they go up, less of the CP1 triangular will rise above them, resulting in a P1 with a smaller duty cycle. On the other hand, when they go down, more of each CP1 triangular wave will be above them, resulting in P1 having a larger duty cycle. (It should be appreciated that there are various ways to achieve the desired feedback, i.e., negative feedback with respect to PID and $I_1$. For example, in an alternative embodiment, a DC reference could be applied at the positive input, and the CP1 signal could be applied to the summing circuit 404 to be added with PID and $I_1$. In this way, the DC reference, rather than the triangular wave, could be adjusted in order to control the output voltage value. Alternatively, CP1 and PID could be combined, e.g., summed, together and applied to the negative input, and the DC reference could be summed with a negative version of $I_1$, with this sum applied to the positive terminal. Various other ways and combinations could be implemented and are within the scope of the invention.)

Summer circuit 408 and comparator 416 function similarly except they act on CP3, PID, and $I_3$ to generate phase signal P3. Summing circuit 406 and comparator 414 also work similarly, except they work on CP2 or CP4 (depending on the selection of switch 410), the PID signal and $I_2$ to generate phase signal P2.

Hysteretic comparators 418 and 420 are used to determine how many of the three phases (P1, P2, and P3) should be engaged. As with the other functional circuit blocks described herein, they may be implemented with any suitable circuitry including but not limited to analog circuit elements, digital logic elements, machine code, and the like. Both comparators receive at their positive inputs the average load current signal ($I_{AVG}$), but comparator 418 receives at its negative input fixed reference signal (Vref3), while comparator 420 receives at its negative input fixed reference signal (Vref2). (The value of Vref3 will be greater than Vref2.) When $I_{AVG}$ is higher than Vref3 (and thereby Vref2 as well), the EN3 and EN2 signals will both be asserted to enable all three phases. On the other hand, when $I_{AVG}$ is higher than Vref2 but smaller than Vref3, then EN3 will de-assert and EN2 will assert so that phase 3 is dropped off and only phases 1 and 2 are active. Finally, when $I_{AVG}$ is less than both Vref2 (and thereby Vref3 as well), then both EN3 and EN2 will de-assert to disable both phase 3 and phase 2 so that only phase 1 remains active. Accordingly, Vref3 should coincide with the point when the average per-phase current becomes inefficiently low for three active phases, and VRef2 should be selected to coincide with the point when the average per-phase current is inefficiently low for two active phases.

The circuit of FIG. 4 not only dynamically controls the number of switch power legs that are active based on load current, but also, it redistributes (when necessary) the remaining phases when a phase is dropped off. In addition, it provides for load balancing for the phases that are active. This can most easily be illustrated with an explanation of how it works when phase 3 is dropped off.

When $I_{AVG}$ goes below Vref3, EN3 de-asserts, which causes phase 3 to be disabled. (Note that the phases, when dropped off, could be isolated from the load or disabled some other way in any suitable manner. For example, a transistor switch controlled by the pertinent enable signal could be used to isolate an associated switch power leg from the load.)

The de-assertion of EN3 also causes switch 410 to select CP4 instead of CP2. This results in the reference triangular at comparator 414 to now be at a relative phase angle of 180° instead of 120°. Accordingly, the two active phases, phase 1 and phase 2 are evenly re-distributed at 0° and 180°, respectively. In addition, note that the sense current for each phase is applied in a negative feedback manner (added to the PID signal) for its associated comparator. This results in reasonable load balancing, both for steady-state and transient conditions because if any switch power leg "comes up" too quickly, it will be inhibited by the duty cycle of its associated driver signal ($P_i$) decreasing. it should be appreciated that these circuit techniques may be scaled to larger numbers of phases. More switches may be required, but with a reference phase source having a sufficient number of tap points, the necessary phase combinations for the different phases (as other phases are removed or added) may reasonably be implemented for sufficiently even phase distribution.

Figure 5:
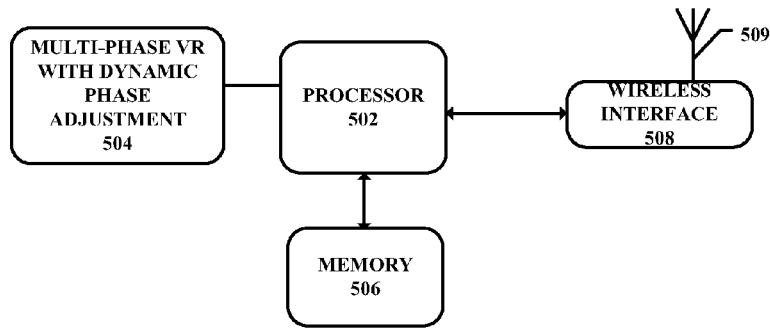
FIG. 5 is a diagram of a computer system with a dynamically phase voltage regulator in accordance with some embodiments.

With reference to FIG. 5, one example of a computer system is shown. The depicted system generally comprises a processor 502 that is coupled to a multi-phase voltage regulator 504, memory 506, and a wireless interface 508. It is coupled to the voltage regulator 504 to receive from it power when in operation. The wireless interface 508 is coupled to an antenna 509 to communicatively link the processor through the wireless interface chip 508 to a wireless network (not shown). The multi-phase voltage regulator has dynamic phase adjustment (e.g., phase enabling/disabling) as disclosed herein.

It should be noted that the depicted system could be implemented in different forms. That is, it could be implemented in a single chip module, a circuit board, or a chassis having multiple circuit boards. Similarly, it could constitute one or more complete computers or alternatively, it could constitute a component useful within a computing system.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

Moreover, it should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. An integrated circuit comprising:
   a plurality or phase legs to supply load current to a load, wherein each or the plurality of phase legs is operable to be enabled or disabled; and
   a controller, coupled to the plurality of phase legs to monitor the load current to enable a number of the phase legs of the plurality of phase legs according to the monitored load current, wherein the controller comprises:
      one or more comparators to generate corresponding one or more phase signals for the plurality of phase legs; and
      one or more summing circuits to generate one or more summed signals to the one or more comparators to control drivers to reduce current in an associated phase leg in response to an increasing sum of a load voltage and sensed current in the phase leg.

2. The integrated circuit of claim 1, wherein the controller is to maintain average current-per-enabled phase leg in a desired range.

3. The integrated circuit of claim 1, wherein the controller is operable to monitor an average of the load current.

4. The integrated circuit of claim 3, wherein the controller comprises:
   one or more hysteretic comparators to compare the average load current against one or more references and to generate enable signals to selectively enable or disable at least one phase leg from among the plurality of phase legs.

5. The apparatus of claim 4, wherein the one or more references have different reference thresholds.

6. The integrated circuit of claim 1, wherein the controller is to redistribute a selected number of enabled phase legs in response to a phase leg being enabled or disabled.

7. The integrated circuit of claim 1, wherein plurality of phase legs is for a multi-phase synchronous buck converter.

8. The integrated circuit of claim 7, wherein the controller includes a load balancing circuitry to provide load balancing for the enabled phase legs.

9. The apparatus of claim 1, wherein the controller comprises circuitry to drive each phase leg based on a monitored load voltage and sensed current in the phase legs.

10. The apparatus of claim 9, wherein the controller includes a switch circuitry to drive the phase leg using a selected reference triangular signal for at least some of the plurality of phase legs.

11. The apparatus of claim 1, wherein each phase leg of the plurality of phase legs comprises a P-type transistor controllably coupled between an applied a supply node and a first node of an inductor.

12. The apparatus of claim 11, wherein a second node of the inductor is to be coupled to the load.

13. The integrated circuit of claim 1, wherein the controller is operable to disable the phase legs, of the plurality of phase legs, one at a time.

14. The integrated circuit of claim 1, wherein a single phase is enabled for a lightest load.

15. The integrated circuit of claim 1 further comprises: a plurality of current sensors coupled to the plurality of phase legs.

16. The integrated circuit of claim 1, wherein the one of more summing circuits are operable to provide the one or more summed signals which are moving thresholds for the one or more comparators.

17. The integrated circuit of claim 1, wherein the controller is operable to generate skewed phase signals for the plurality of phase legs, the skewed phase signals skewed in time.

18. The integrated circuit of claim 1, wherein the controller is operable to enable or disable a phase leg, from the plurality of phase legs, when the load current is higher or lower than a predetermined threshold window.

19. A computer system comprising:
   a processor;
   a voltage regulator having:
      a plurality of phase legs to supply load current to the processor, wherein each of the phase legs of the plurality of phase legs is operable to be enabled or disabled; and
      a controller, coupled to the plurality of phase legs, to monitor load current to enable a number of the phase legs of the plurality of phase legs according to the monitored load current wherein the controller comprises:
         one or more comparators to generate corresponding one or more phase signals for the plurality of phase legs; and
         one or more summing circuits to generate one or more summed signals to the one or more comparators to control drivers to reduce current in an associated phase leg in response to an increasing sum of a load voltage and sensed current in the phase leg; and
   an antenna coupled to the processor to communicatively link it with a wireless network.

20. The system of claim 19, wherein the controller comprises a circuitry which is operable to monitor an average of the supply current.

21. The system of claim 20, wherein the circuitry comprises one or more hysteretic comparators to compare an average supply current against one or more references corresponding to levels where phases are to he enabled or disabled.

22. The system of claim 19, wherein the voltage regulator implements at least one of: a multi-phase synchronous buck converter, boost converter, bust-boost converter, or fly back converter.

23. The system of claim 19, wherein the controller is to maintain average current-per-enabled phase leg, in a desired range.

* * * * *